Oct. 6, 1953 C. H. STOCKDALE ET AL 2,654,384
FLOW DIVIDER DEVICE
Filed March 21, 1950 2 Sheets-Sheet 1

INVENTORS
Charles H. Stockdale
Douglas Johnson
BY
Ralph T. French
ATTORNEY

INVENTORS
Charles H. Stockdale
Douglas Johnson
BY Ralph T. French
ATTORNEY

Patented Oct. 6, 1953

2,654,384

UNITED STATES PATENT OFFICE 2,654,384

FLOW DIVIDER DEVICE

Charles H. Stockdale, Springfield, and Douglas Johnson, Ridley Park, Pa., assignors to Westinghouse Electric Corporation, East Pittsburgh, Pa., a corporation of Pennsylvania Application March 21, 1950, Serial No. 150,966

5 Claims. (Cl. 137—118)

This invention relates to fuel supply systems, and more particularly to fuel supply apparatus for a gas turbine power plant.

In the operation of a gas turbine power plant utilizing fluid fuel, it is desirable to effect division of the flow of fuel in substantially equal amounts to the respective fuel nozzles of the combustion apparatus, in order that there may be uniform heat release and consequently uniform temperature distribution at all circumferential points of the turbine inlet passage. With an aviation turbojet engine, operative at altitudes above 40,000 feet, equalized division of fuel flow is particularly desirable for preventing disturbances of combustion stability under the conditions of vaporization, effusion of air and heat effect encountered at such altitudes. One object of the present invention is the provision of improved flow divider means for achieving the foregoing desired results.

It has been proposed to equip a gas turbine engine with pressure responsive nozzles having variable orifices, which are individually supplied with fuel from a plurality of balancing valves fed from a flow divider device having a corresponding number of orifices of predetermined flow area. In the flow divider device to which fuel is metered from the usual pump and control apparatus, the fuel pressure on the upstream side of each orifice is the same. The function of the balance valves is to maintain substantially equal fuel pressures on the downstream sides of the orifices, thereby to effect equal pressure drops thereon for promoting uniform flow through all orifices. Under service conditions, however, it may be difficult to achieve exact equalization of flow with such a flow divider device, due to the difficulty of providing identical orifices to ensure equal fuel flow rates for all nozzles. Another object of this invention is to provide auxiliary means adapted for cooperation with a fuel system of the aforesaid type for obviating any difficulty heretofore experienced with respect to variations in orifice flow areas.

The problem of fuel flow division is critical. A flow divider operative with an accuracy of ±5% may, for example, permit turbine inlet circumferential temperature variations, on any selected radius, ranging from 650° F. to 250° F. on various engines. In the accompanying drawings, hereinafter more fully described, Fig. 2 constitutes a chart showing a typical turbine inlet temperature pattern. Curve A shows the coldest radial temperature plot occurring at a selected circumferential location. Curve C shows the hottest radial temperature plot occurring at another circumferential location. Curve B represents the average of all radial temperature plots taken from all circumferential areas of the turbine inlet. The amount of energy released within the engine is represented by the area under curve B. Since point X indicates the maximum temperature allowable upstream of the turbine, it will be seen that fuel can be supplied to the engine in ever increasing quantities only until some area in the turbine inlet reaches the point of about 1800° F., which limits the performance of the engine. Further increase in rate of fuel flow would reduce the life of the turbine and endanger the engine.

If the maximum turbine inlet circumferential temperature variation on any given radius could be reduced to zero degrees (0° F.), then the curves A, B and C of the chart would coincide, and curve C would not only be the hottest radial temperature plot, but the coldest and the average radial temperature plot as well, so that the amount of energy released within the engine would be that represented by the area under curve C. It is another object of the present invention to provide improved flow divider apparatus promoting the attainment of the above ideal performance characteristics, by effecting equalization of the fuel flow through a plurality of nozzles with a degree of accuracy rendering possible the achievement of a favorable uniformity of temperature circumferentially of the turbine inlet.

Since the safe available thrust of a turbojet engine thus approaches a maximum when its turbine inlet circumferential temperature variation is zero, many existing types of turbojet could safely be operated to develop more thrust if equipped with means for reducing variations in turbine inlet circumferential temperature. A further object of the invention is to provide flow divider means which is adapted for association with combustion apparatus of the grouped unit or can type, as well as with annular combustion apparatus, and which is thus readily applicable to existing power plants for increasing the thrust rating thereof.

A feature of the invention is the provision of a flow divider device for association with a plurality of fuel nozzles, comprising a stationary member having an equal number of circumferentially spaced fuel passages, and a rotary orifice plate having orifices of predetermined flow area cooperative therewith to effect flow of fuel to each nozzle by way of all such orifices in succession, thus effectively distributing the same average quantity of fuel to all nozzles within a short interval of time.

These and other objects are effected by our invention as will be apparent from the following description and claims taken in connection with the accompanying drawings, forming a part of this application, in which:

Fig. 1 is a schematic elevational view, partly in section, of an aviation gas turbine power plant equipped with fuel flow distribution apparatus constructed in accordance with the invention;

Fig. 2 is the temperature distribution chart already referred to;

Fig. 4 is a fragmentary plan view, partly broken away, of the stationary and rotary orifice plates of the flow divider device shown in Fig. 3; and Fig. 5 is a sectional development of a portion of the orifice plates taken along the line V—V of Fig. 4.

Figure 3:
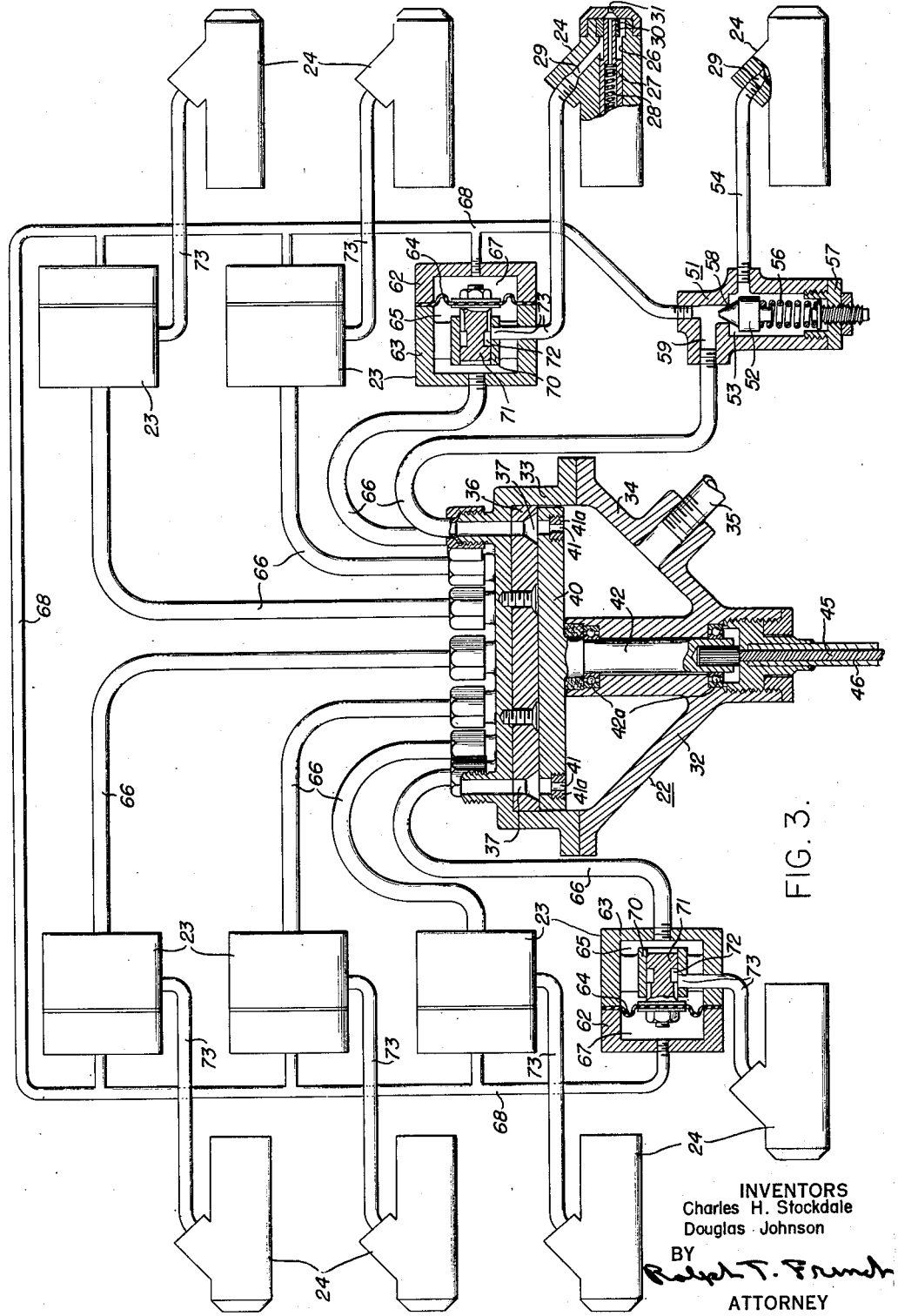
Fig. 3 is a diagrammatic enlarged-detail view of improved fuel distributing apparatus constructed in accordance with the invention and adapted for association with the power plant as shown in Fig. 1.

In Fig. 1 of the drawings, the invention is illustrated in association with the combustion apparatus of a conventional gas turbine engine 9, which in the form shown comprises a cylindrical outer casing structure 10 having mounted therein a sectional core structure 11, which with the casing structure 10 defines an annular flow passageway 12 that extends longitudinally through the engine from a frontal air intake opening 13 to a rearwardly-disposed discharge nozzle 14. The casing structure 10 is adapted to be mounted in or on the fuselage or wing of an aircraft (not shown), with the intake opening 13 pointed in the direction of flight. The axially-aligned operating elements of the engine disposed in the casing structure 10 include an axial flow compressor 15 having a rotor 16, annular fuel combustion apparatus 17, and a turbine 18, the rotor 19 of which is operatively connected to the compressor rotor 16 through the medium of a hollow shaft 20, which may be suitably journaled in the casing structure. In operation, air drawn into the intake opening 13 is compressed by the compressor 15 and delivered to the combustion apparatus 17, to which fuel is supplied by way of apparatus hereinafter described. The resultant hot motive gas is then supplied from the combustion apparatus to the turbine 18, and is finally discharged through the nozzle 14 in the form of a jet establishing a propulsive thrust.

According to the invention, the fuel supply system may comprise a reservoir 20, fuel governor and pump apparatus 21 of any desired type for supplying fuel at a rate selected according to the setting of a throttle 21a, a flow divider or distributing valve device 22, and a plurality of pressure balancing valves or equalizing valve devices 23. The driven elements of the governor and pump apparatus 21 are operatively connected to the rotor of the engine 9 through the medium of suitable gearing (not shown) in a gear box 25, which is carried on the outer casing 10.

The equalizing valve devices 23 are individually operative to supply fuel to the required number of fuel nozzles 24 which are circumferentially spaced with relation to the annular combustion apparatus 17. These nozzles are preferably of the variable orifice type, and may each have the construction of that illustrated in section in Fig. 3, comprising a casing having a bore 26 in which a piston valve 27 is slidably mounted. The piston valve 27 is subject to the opposing pressures of a spring 28 and of fuel admitted to the bore 26 by way of an inlet passage 29, and is operative to uncover one or more ports 30, according to the fuel pressure, for effecting discharge of fuel from the bore through an outlet opening 31.

Referring to Fig. 3 of the drawings, the flow divider or distributing valve device 22 comprises casing sections 32 and 33 having a fuel receiving chamber 34, which communicates through an inlet conduit 35 with the discharge side of the governor and pump device 21 shown in Fig. 1. Mounted in the casing section 33 at the end of the chamber 34 opposite the inlet thereof is a stationary fuel collector plate 36 in which are formed a plurality of circumferentially disposed outlet ports 37 corresponding in number to the nozzles 24. In a typical installation, sixteen nozzles and the same number of ports 37 will be provided. The respective ports 37 are somewhat enlarged adjacent the inner surface of the collector plate 36, and are separated by radial ridges or knife edges 38 formed on the inner surface of the plate, as best shown in Fig. 5. For effecting supply of fuel to all the ports 37 in succession, there is provided a rotary orifice plate or valve member 40, which is rotatably mounted in the casing section 33 adjacent the plate 36, and has circumferentially spaced calibrated orifices 41 corresponding in number to the ports 37 and adapted to register successively therewith during rotation of the orifice plate. All orifices 41 are made as nearly identical as possible, and may be formed in plugs 41a screwed into suitable openings formed in the orifice plate 40. The valve member 40 has an axial shaft 42 which is journaled in bearings 42a carried by the casing section 32. The shaft 42 extends through the chamber 34, the outer end of the shaft being connected to the splined end of a rotary cable 45 operative for turning the shaft. The cable 45 is housed in a flexible tube 46, and terminates in a suitable coupling (not shown) in the gear box 25, which contains a driving train of reduction gears operative to drive the cable and rotary plate 36 from the engine 9.

Mounted adjacent the distributing valve device 22 is a control valve or reducing valve device 51, comprising a valve element 52 which is disposed in a valve chamber 53 communicating through a conduit 54 with the inlet 29 of one of the nozzles 24. A spring 56 is interposed between a plug 57 and the valve element 52 for urging the latter toward a seat 58 to control communication between the valve chamber 53 and a passage 59 leading from one of the ports 37 of the distributing valve device 22.

Each of the similar equalizing valve devices 23 associated with the individual nozzles 24 comprises casing sections 62 and 63 between which is clamped a diaphragm 64, the casing sections and diaphragm cooperating to provide, on one side of the diaphragm, a valve chamber 65 communicating through a conduit and passage 66 with one of the ports 37 in the distributing valve device 22. Formed at the other side of the diaphragm 64 is a chamber 67 which is connected to a control conduit 68. The control conduit 68 communicates with the passage 59 of the control valve device 51. Mounted in a guide 70 in each valve chamber 65 is a slide valve 71, which is operatively connected to the diaphragm 64 and has an annular groove 72 for controlling communication between the valve chamber 65 and a port and conduit 73 communicating with the inlet 29 of the associated nozzle 24. The equalizing valve devices 23 and reducing valve device 51 correspond generally to the similar apparatus disclosed in the application of Cyrus F. Wood and Linn F. Cummings filed June 10, 1949, Serial No. 98,334, and assigned to the assignee of the present application.

The apparatus shown in Fig. 3 operates as follows: fuel under pressure delivered by the governor and pump equipment 21 is supplied by way of the conduit 35 to the chamber 34 of the distributing valve device 22, and thence flows through the registering orifices and ports 41 and 37 and related conduits 66 to the valve chambers 65 of the several equalizing valve devices 23. At the same time, the valve element 52 is operated by fuel under pressure flowing through the passage 59 to meter some of the fuel through conduit 54 to the corresponding nozzle 24, while the back pressure of fuel in passage 59 constitutes a control pressure and is communicated by way of the control conduit 68 to the diaphragm chamber 67 of each equalizing valve device 23. The diaphragms 64 of all equalizing valve devices 23 are thus subjected to the same control pressure for rendering uniform the rate of flow of fuel by way of the associated slide valves 71 to the respective nozzles 24.

With the orifice plate 36 rotated by means of the cable 45, the fuel is fed from the chamber 34 to the ports 37 through all of the orifices 41 in succession. Although the orifices 41 are intermittently brought into and out of registration with the respective ports 37, fuel is thus supplied through the plurality of conduits 66 to the connected equalizing valves 23 and nozzles 24 in successive increments at a sufficiently rapid rate to produce, in effect, a continuous flow of fuel to each area of the combustion apparatus of the engine. The distributing valve device 22 is thus designed to divide the flow of fuel into the desired number of substantially equal paths, irrespective of minor variations which may be unavoidable in formation of the flow areas of the orifices. The quantity of fuel flowing through each orifice 41 is thus successively injected through all of the ports 37, and is ultimately fed to all of the fuel nozzles in turn, so that each nozzle will pass the same average amount of fuel over an interval of time. If it is assumed that a speed of 10 R. P. M. is adapted for the rotating orifice plate 40, for example, fuel flowing through each of the orifices 41 will be injected into the combustion chamber by way of a corresponding nozzle during an interval of 1/60 minute at a time. Each orifice thus supplies each nozzle during very short intervals of time, and all orifices supply all nozzles with the result that appreciable variations in turbine inlet circumferential temperature will be minimized.

It will be seen from the foregoing that the improved flow divider apparatus will thus be operative to ensure equal distribution of fuel flow to the fuel nozzles 24 so as to facilitate maintenance of flow balance and consistency of fuel distribution in the gas turbine engine 9. With temperature variations at the turbine inlet reduced to a minimum, the thrust of the engine nozzle 14 may safely be increased, without endangering the turbine blades, and without increasing the likelihood of cracking of the usual turbine inlet nozzle structure due to thermal shock.

While we have shown our invention in but one form, it will be obvious to those skilled in the art that it is not so limited, but is susceptible of various changes and modifications without departing from the spirit thereof.

What is claimed is:

1. Fuel flow divider means for a gas turbine engine having annular combustion apparatus and a plurality of circumferentially spaced fuel supply devices therefor, comprising casing structure forming a chamber having an inlet communicating with a source of fuel under pressure, said casing structure including a collector plate forming a wall of said chamber and having a plurality of circumferentially spaced discharge ports each adapted to communicate with one of said fuel supply devices, said collector plate having knife edges formed between and separating said ports on the side adjacent said chamber, a rotary orifice element mounted in said chamber adjacent the side of the collector plate having said knife edges between said discharge ports and having a plurality of similarly spaced restricted orifices successively registerable therewith, and means for driving said orifice element from the engine for effecting flow in separate courses from said chamber through said ports to said fuel supply devices by way of all of said restricted orifices in rapid succession.

2. Fuel supply apparatus for effecting equal flows of fuel under pressure in a plurality of courses, comprising a source of fuel under pressure, a flow divider device having a chamber communicating with said source, a wall of said chamber having a plurality of circumferentially arranged and uniformly spaced ports, rotary means in said chamber having an equal number of similarly disposed orifices adapted for registering with said ports, said rotary means being operable to bring said orifices and ports rapidly and successively into registration to effect a substantially continuous fluid flow from said chamber by way of each of said ports through said orifices in succession for effecting equal distribution of fuel delivered from said source, means for establishing a control fluid pressure, and a plurality of equalizing valve devices subject to the opposing pressures of said control fluid and of the fuel flowing through said ports, respectively, for controlling the supply of fuel in equal courses.

3. In a fuel system including a source of fuel under pressure, in combination, means including a reducing valve responsive to pressure of fuel from said source for maintaining a predetermined control fluid pressure, a plurality of equalizing valve devices for controlling flow of fuel in separate courses from said source in accordance with said control pressure, and a flow divider device for effecting uniform distribution of fuel thereto from a common source, said flow divider device comprising a fuel chamber having an inlet communicating with the fuel source, a stationary element in said chamber having a plurality of circumferentially disposed and uniformly spaced outlets communicating with the respective equalizing valve devices, a rotary element mounted in said chamber and having a like member of similarly disposed orifices adapted for registering with said outlets, and means for driving said rotary element to bring said orifices rapidly and successively into registration with said outlets to effect substantially continuous supply of fuel from said chamber through all of said orifices in succession to each of said outlets and consequently in separate courses of equal flow rate.

4. A flow divider device for distributing fuel from a source of fuel under pressure in a plurality of discharge courses comprising a casing having a fuel receiving chamber communicating with said source, an element disposed in said chamber and having a plurality of circumferentially arranged and uniformly spaced ports corresponding to said discharge courses, respectively, another element rotatably mounted in said chamber and having an equal number of similarly arranged calibrated ports each adapted for registering with the first-named ports, the last named element being continuously rotatable to effect rapid and successive registration between all ports in the respective elements for thereby causing substantially continuous distribution of fuel from said chamber in uniform discharge courses, and an operating member for said rotatable element.

5. Apparatus as set forth in claim 4 characterized by the disposition of substantially radial knife edges between the ports in at least one of said elements, with the other element mounted adjacent said knife edges for facilitating substantially continuous flow of fuel from each of the calibrated ports of the one element to the ports of the other element as communication thereto is rapidly and successively established during rotation of the element driven by the operating member.

CHARLES H. STOCKDALE.
DOUGLAS JOHNSON.

References Cited in the file of this patent

UNITED STATES PATENTS

| Number | Name | Date |
|---|---|---|
| 1,968,390 | Hamilton | July 31, 1934 |
| 2,145,640 | Alden | Jan. 31, 1939 |
| 2,430,264 | Wiegand et al. | Nov. 4, 1947 |
| 2,536,440 | Greenland | Jan. 2, 1951 |

FOREIGN PATENTS

| Number | Country | Date |
|---|---|---|
| 577,132 | Great Britain | May 7, 1946 |
| 857,523 | France | Apr. 22, 1940 |